United States Patent [19]
Kou

[11] Patent Number: 5,874,928
[45] Date of Patent: Feb. 23, 1999

[54] METHOD AND APPARATUS FOR DRIVING A PLURALITY OF DISPLAYS SIMULTANEOUSLY

[75] Inventor: Wallace Kou, Los Altos, Calif.

[73] Assignee: Philips Electronics North America Corporation, New York, N.Y.

[21] Appl. No.: 519,142

[22] Filed: Aug. 24, 1995

[51] Int. Cl.$^6$ .................................................. G09G 5/00
[52] U.S. Cl. ...................................................... 345/1; 345/3
[58] Field of Search ................................. 345/3, 89, 98, 345/200, 1, 153, 154, 155, 2; 364/237.3, 927.4; 395/750

[56] References Cited

U.S. PATENT DOCUMENTS

| | | |
|---|---|---|
| 5,150,109 | 9/1992 | Berry .......................................... 345/3 |
| 5,218,274 | 6/1993 | Zenda ......................................... 345/3 |
| 5,374,940 | 12/1994 | Corio ......................................... 345/1 |
| 5,387,923 | 2/1995 | Mattison et al. ......................... 345/103 |
| 5,537,128 | 7/1996 | Keene et al. ............................... 345/89 |
| 5,548,765 | 8/1996 | Tsunoda et al. ......................... 395/750 |
| 5,629,715 | 5/1997 | Zenda ......................................... 345/3 |

Primary Examiner—Steven J. Saras
Assistant Examiner—David L Lewis
Attorney, Agent, or Firm—Brian J. Wieghaus

[57] ABSTRACT

A method and apparatus for a display controller connected to a host computer and driving a plurality of displays, the displays being refreshed independently for optimizing the viewing quality of each display. The invention further provides a power controller for reducing power consumption when the display memory is not being updated by the host computer.

25 Claims, 4 Drawing Sheets

METHOD AND APPARATUS FOR DRIVING A PLURALITY OF DISPLAYS SIMULTANEOUSLY

FIELD OF THE INVENTION

This invention relates generally to display controllers and more particularly to a display controller for driving a plurality of displays simultaneously.

BACKGROUND OF THE INVENTION

The mobile or portable computer segment of the personal computer marketplace has grown rapidly over the recent past and has become a mainstream product area rather than a niche. This growth has been fueled by the design of products which allow the user to run the same applications with substantially the same performance as the desktop versions of personal computers.

Portable computers are equipped with a built-in Liquid Crystal Display (LCD) and typically a connector for use with an external CRT monitor. When operating in a mobile environment on battery power, the user must rely solely on the LCD display. The viewing quality of this display is dependent on the LCD technology employed and the display controller in the portable computer which drives the display. Although monochrome LCD displays remain in use at the low end of the product line, most portable computers today incorporate a color LCD.

The color LCD display panels in current products generally fall into two basic types—active matrix and passive matrix. In the active matrix display panel, a trio of thin film transistors (TFT) is paired with liquid crystal elements to activate each pixel. A matrix of color filters representing Red, Green and Blue light is arranged to provide the resultant color display. Active matrix flat panel displays exhibit superior display quality over passive matrix technology, but pay a penalty in power consumption, resulting in shorter battery life in portable computers, and are significantly more costly due to the relatively low yield achieved in production.

The passive matrix display panel is composed of an orthogonal matrix of conductive stripes or electrodes between sheets of glass with the intersections of the stripes defining a matrix of displayable locations corresponding to pixels. The matrix is scanned by applying voltage to the rows and columns in sequence, a complete scan of the matrix being termed a frame. As each pixel is scanned, it becomes visible by means of polarizing light transmitted through the panel from a source known as the backlight. For a color display, white light is passed through layers of filters controlled by liquid crystal material. The color of a scanned pixel is determined by the polarization of liquid crystal material in the filters, which is in turn controlled by color code inputs to the panel. The passive matrix panel is considerably less costly with lower power consumption than the active matrix panel, albeit with inferior display quality. The passive matrix LCD continues to be used in a large portion of the portable computer market.

Because the viewing quality of the passive matrix display panel is greatly dependent on refresh rates, recent advances in the technology have produced a version of the passive matrix panel which divides the display into an upper and lower panel. Data is provided to each panel simultaneously, in effect doubling the refresh or frame rate and achieving a corresponding improvement in the viewing quality of the display without a significant increase in cost. This type of panel is termed a Dual Scan panel since the two panels are scanned simultaneously.

The Dual Scan panel imposes a unique burden on the LCD controller used to generate the display in the portable computer. In prior art controllers, the data displayed on the LCD was directly derived by capturing the sequential data stream targeted for the CRT and converting the data to LCD format. As a consequence, the refresh frame rate for the panel was identical to that set for the CRT. As the Dual Scan panel requires the simultaneous presentation of data from two disjoint areas of display memory, the straightforward sequential data capture method is not workable.

Several solutions to this problem have been implemented. Some prior art controllers have implemented a frame buffer technique, wherein the data for the panel is captured in a separate buffer. The LCD panel controller logic then accesses the frame buffer to acquire the data for both upper and lower panels. This results in the panel refresh rate matching that of the CRT. The problem is that the passive matrix generally requires a refresh rate which is significantly higher than that tolerated by the CRT for optimum viewing quality. Another problem is that the prior art controllers processed the color data through a dithering engine prior to storage in the frame buffer. The dithering engine must be tightly coupled with the display refresh in order to achieve the maximum benefit of perceived color expansion. This would not be the case when the frame buffer stores dithered data.

An improvement in the prior art was the use of frame acceleration. In this architecture, the panel is refreshed from two sources—the CRT data stream and the frame buffer. During the first half of the display frame, the upper half of the panel is refreshed from the CRT data stream while the lower half of the panel is refreshed from the frame buffer. At the point of crossover where the CRT display is at the scan line following the last upper panel line, the refresh sources are reversed. This results in the panel being refreshed at twice the CRT rate, resulting in an improved display viewing quality. One problem with this approach is that the dithered data becomes displaced by one frame in each half of the panel, resulting in limitations and disadvantageous use of the dithering engine. Another problem is a compromise in the optimum refresh rate. Either the CRT or the LCD panel viewing quality may have to be sub-optimal to compensate for the other device.

A variation on the frame acceleration approach used in the prior art was the use of a half frame buffer. One of the panels is refreshed by data from the CRT display stream, while the other panel is refreshed from the half-frame buffer separately. The display memory and the half-frame buffer are accessed synchronously to maintain coherence of the display. A problem remaining with this solution is that, particularly when the CRT and LCD panel displays are concurrently active, the refresh frame rate available to the LCD panel is governed by the CRT parameters and cannot be optimized for panel requirements. Another problem is that the power consumption of the video subsystem is proportional to the clock rates at which the logic is driven. The rates required by the CRT force the power consumption of the LCD sub-system to be higher than necessary. Another problem arises because the half-frame buffer is linked to a specific area of display memory. As most portable computers comply with the Video Graphics Adapter (VGA) standard, market requirements dictate that strict compatibility must be maintained. An operation involving the Line Compare Register operation conflicts with the half frame buffer approach. In this operation, a scan line count can be set in the controller which, when the preset number of scan lines have been displayed, resets the display memory pointer to the start of memory. This allows the scrolling of part of the display, while the remainder is static. If, as an example, the half frame buffer is a copy of the last half of display memory, only that portion of memory can be displayed on the lower panel. If the line compare operation is active, the lower panel might be required to display a portion of the first half of display memory. The controller would then not allow strict compatibility with VGA standards.

An alternate solution to the Dual Scan problem is given in U.S. Pat. No. 5,387,923. The patent discloses a controller using address translation logic to interleave data written by the host computer sequentially in display memory, thereby alternating upper and lower panel data as memory is sequentially accessed. This eliminates the need for an additional buffer but again does not solve the problem of optimizing LCD refresh rates and VGA compatibility problems, such as Line Compare, are not addressed.

Accordingly, the present invention provides a display controller which provides refresh rates which may be optimized for viewing quality on a plurality of display mechanisms without detrimental interaction. The present invention also maintains compatibility with graphics standards while providing the improved display quality.

In view of the shortcomings of the prior art, there exists a need for an improved mechanism for optimally driving both a CRT and an LCD simultaneously.

SUMMARY OF THE INVENTION

The present invention is based, at least partially, on the observation that the shortcomings of the prior art display controllers arise from the fact that the LCD refresh rate is derived from and dependent upon the CRT refresh rate. CRT's and LCD's are very different display devices, and as such, require very different refresh rates. In order to operate optimally, each device needs to have its own customized refresh rate. In accordance with this observation, the present invention provides a method and apparatus for driving a plurality of displays simultaneously wherein each display is refreshed at an optimal rate, with each refresh rate being independent of the other refresh rate or rates.

According to the present invention, a plurality of displays is driven simultaneously by first storing a set of graphics data into a display memory. This set of graphics data represents the information to be displayed. Once stored, the graphics data is read out of the display memory into a video buffer. Thereafter, the graphics data is read out of the video buffer at a rate determined by a video clock signal having a first clock rate to provide a first graphics data stream. This first graphics data stream is then processed through a first converter, again at a rate determined by the video clock signal having the first clock rate, to derive a first video data stream having an analog portion and a digital portion. The analog portion is sent to a first display, preferably a CRT type of display, to drive the display. Preferably, the clock rate of the video clock signal is set such that the first display is refreshed at a rate which optimizes the performance of the display.

The digital portion of the first video data stream is then further converted into a second video data stream which is used to drive the second display. The second display is preferably an LCD type of display. This conversion process preferably begins with converting the digital portion of the first video data stream into a second stream of graphics data. This step places the digital portion of the first video data stream into a proper format for the second display. Preferably, this step involves processing the digital portion of the first video data stream through a weighting and a mapping function. Once the second stream of graphics data is derived, it is stored into a write buffer. Thereafter, the second stream of graphics data is read out of the write buffer into a frame buffer where the data is stored.

A significant point to note is that when the second stream of graphics data is stored into the write buffer, the storing is done at a rate determined by the video clock signal having the first clock rate. However, when the second stream of graphics data is read out of the write buffer and into the frame buffer, the reading and storing are done at a rate determined by a memory clock signal having a second clock rate which is independent of the first clock rate. Thus, the write buffer in effect provides a mechanism for changing clock rates. It is this mechanism which enables the present invention to use the same graphics data stream (the data stream from the video buffer) to run two separate displays, and yet refresh each display using an independent clock rate.

After the second stream of graphics data is stored into the frame buffer, the data is read out of the frame buffer at a rate determined by the memory clock signal having the second clock rate. In turn, a read buffer receives and stores the second stream of graphics data from the frame buffer at a rate determined by the memory clock signal. Thereafter, the second stream of graphics data is read out of the read buffer, again at a rate determined by the memory clock signal, to a dithering engine. Preferably, the dithering engine processes the second stream of graphics data, at a rate determined by the memory clock signal, to derive a set of dithered data. The dithered data is thereafter sent to a display controller where it is converted into a second video data stream at a rate determined by the memory clock signal. The second video data stream is then sent to a second display, at a rate determined by the memory clock signal, to drive the second display. Hence, the second display is driven by a video data stream having a clock rate determined by the clock rate of the memory clock signal. Preferably, the clock rate of the memory clock signal is selected such that the second display is refreshed at a rate which optimizes the performance of the display.

As shown by the above discussion, the present invention provides a mechanism for simultaneously driving a plurality of displays which refreshes each of the displays at an optimal refresh rate for that display. This significantly improves the performance of both of the displays.

DETAILED DESCRIPTION OF THE PREFERRED EMBODIMENTS

Figure 1:
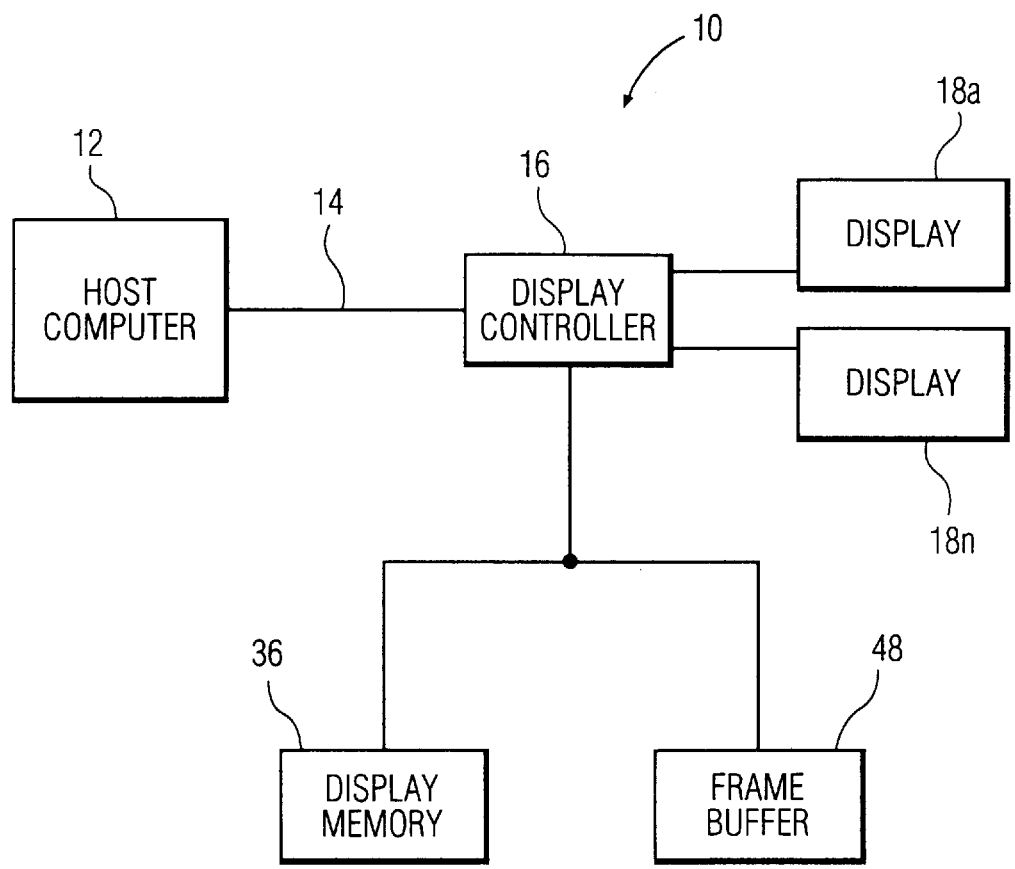
FIG. 1 is a block diagram representation of a system 10 wherein the display controller 16 of the present invention is implemented.

With reference to FIG. 1, there is shown a block diagram representation of a system wherein the present invention may be implemented, the system 10 comprising a host computer 12, a display controller 16 of the present invention coupled to the host computer via bus 14, a display memory 36, a frame buffer 48, and a plurality of displays 18a–18n coupled to the display controller 16. Host computer 12, which may be any desired type of computer, such as a Personal Computer, generates, updates, and provides graphics data to the display controller 16. It is the responsibility of the display controller 16 to convert the graphics data stored in display memory into video signals that can be used to drive the displays 18a–n. In general, there may be any number of displays 18a–18n, and the type of display may vary. In the preferred embodiment, there are two displays, with one display being a CRT display and the other display being an LCD.

Figure 2:
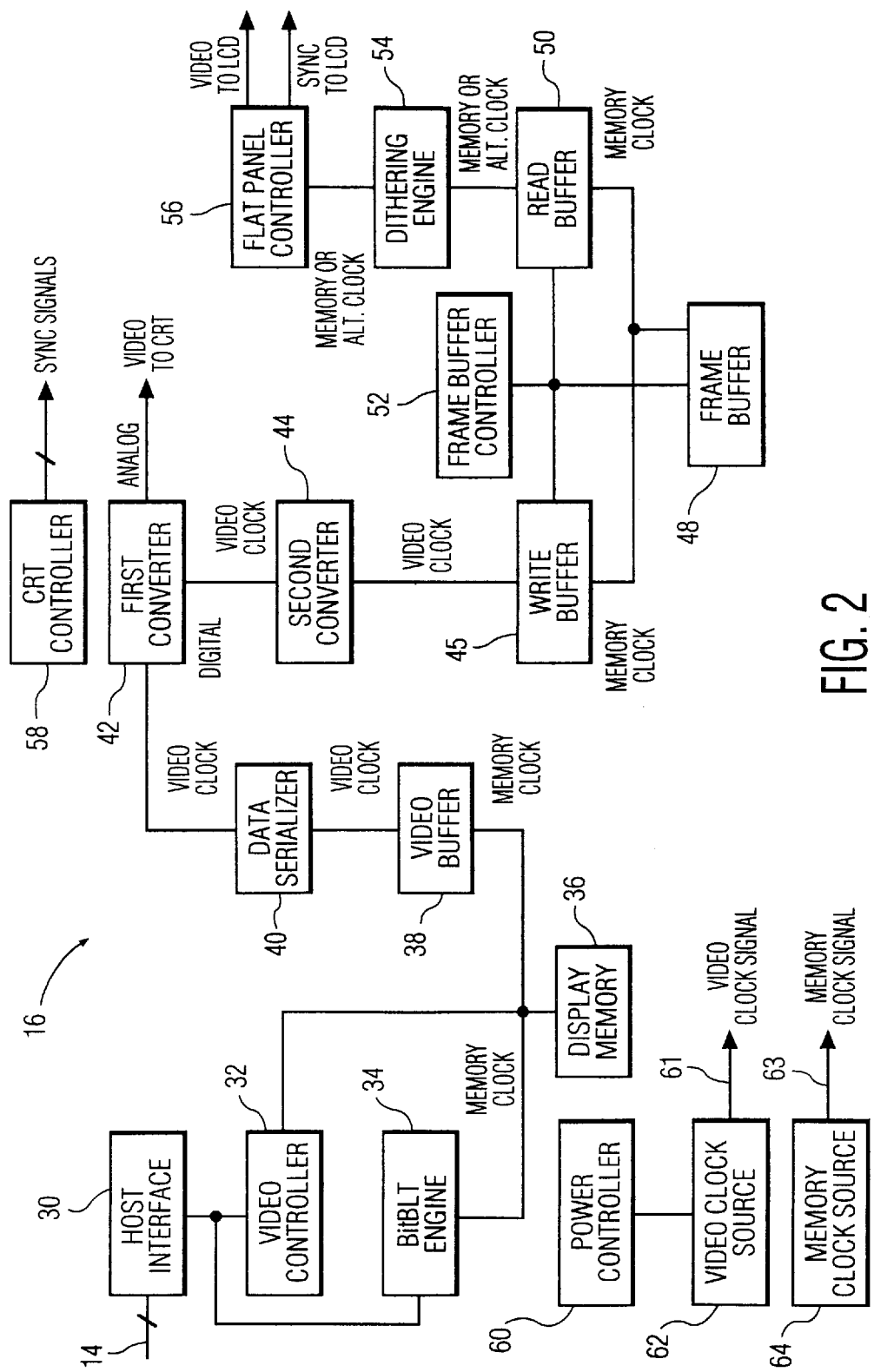
FIG. 2 is a detailed block diagram of the display controller of the present invention.

With reference to FIG. 2, there is shown a more detailed block diagram representation of the display controller 16 of the present invention. Before describing controller 16 in detail, it should be noted that the various components in controller 16 operate based on two different and separate clock signals. The video clock signal 61 is derived from the video clock source 62, and the memory clock signal 63 is derived from the memory clock source 64. The clock sources 62, 64 may reside within the controller 16 itself to generate the clock signals 61, 63, or the clock signals 61, 63 may be derived from an external device. Preferably, the clock signals 61, 63 are separate clock signals having clock rates which are independent of one another. To indicate which clock signal is used in which portion of the controller 16, the terms "video clock" and "memory clock" have been placed throughout FIG. 2. One of these terms placed between two components indicates that the rate of data transfer between those components is determined by the rate of the clock signal so indicated. For example, the term "memory clock" placed between the frame buffer 48 and the read buffer 50 indicates that the rate of data transfer from the frame buffer 48 to the read buffer 50 is determined by the clock rate of the memory clock signal. The same labeling scheme is used for the entirety of FIG. 2. With this labeling convention in mind, the controller 16 of the present invention will now be described in detail.

Controller 16 preferably first comprises a host interface 30 coupled to the host bus 14 for interfacing the controller 16 with the host computer 12. The functions of interface 30 include: (1) receiving commands and data from the host computer 12; and (2) sending status information and data from the controller 16 to the host computer 12. The host interface may comprise an address decoder for determining whether the controller 16 is being accessed, write control logic for steering data from the bus 14 into the display memory 36, read control logic for moving data from the display memory 36 onto the bus 14, and input/output buffers for storing data temporarily. The exact configuration of interface 30 will depend upon the particular host computer bus 14 used in the system 10.

The host interface 30 is coupled to two other components, the video controller 32 and the BitBLT (Bit Block Transfer) engine 34. In turn, both the video controller 32 and the BitBLT engine 34 are coupled to the display memory 36. It is in display memory 36 that graphics data received from the host computer 12 is stored. In the preferred embodiment, the video controller 32 preferably comprises a sequencer and a graphics controller. The sequencer is primarily responsible for controlling the flow of data between the host computer 12 and the display memory 36 via bus 14 according to the mode (such as EGA, VGA, etc.) set for the controller 16. The control functions performed by the sequencer include mapping the display memory 36 into planes, masking to selectively operate on planar data, and character clocking for text modes. The graphics controller, on the other hand, is primarily responsible for performing logical operations on the data stored in the display memory 36 to manipulate the data. These logical operations include ANDing, ORing, comparing, and rotating the graphics data in the display memory.

Typically, the host computer 12 is directly involved in the transfer of data to and from display memory 36. In order to improve system performance by transferring blocks of data without requiring direct involvement of the host computer, the BitBLT engine 34 is utilized. The BitBLT engine 34, which takes the form of a set of control logic, is responsible for transferring blocks of pixel data locally within the display memory 36, and for transferring blocks of data between the display memory 36 and the host computer memory (not shown) via bus 14 with minimal intervention from the host computer 12. In addition to just moving blocks of data, the BitBLT engine also has the ability to perform logical operations on the blocks of data as they are being transferred to further manipulate the data.

Together, components 30, 32, 34, and 36 interact with the host computer 12 to receive, manipulate, and store the graphics data generated by the host computer 12. Once stored in the display memory 36, the graphics data is ready to be converted into video signals which can be used to drive the displays 18. In the preferred embodiment, the display controller 16 simultaneously drives two separate displays. A first display is preferably a CRT type of display, such as a computer monitor or a television receiver. The second display is preferably an LCD. Of course, it should be noted that the concepts taught herein may be extended to drive any number and any type of displays.

In converting the graphics data stored in the display memory 36 into a set of video signals appropriate for driving a CRT type of display, the video buffer 38, the data serializer 40, and the first converter 42 are used. The video buffer 38 preferably is a first-in-first-out (FIFO) buffer which receives and stores graphics data from the display memory 36, and outputs the stored graphics data to the data serializer. An interesting point to note with regard to video buffer 38 is that graphics data is loaded into the buffer 38 at a rate determined by the rate of the memory clock signal (as shown in FIG. 2). However, data is outputted from the buffer 38 to the data serializer 40 at a rate determined by the clock rate of the video clock signal. Preferably, buffer 38 has sufficient depth to compensate for the difference between these two clock rates. As will be explained in a later section, these different clock rates allow the buffer 38 to be commensurate with the performance capability of the display memory while at the same time, optimizing the refresh rate of the CRT display.

Data serializer 40 is coupled to and receives the graphics data outputted from the video buffer 38. The primary function of serializer 40 is to convert graphics data received from the video buffer 38 into a graphics data stream. As an example, a 32-bit data word from buffer 38 may be converted into a serialized stream of four 8-bit data words representing four sequential pixels on the display screen. As an additional function, serializer 40 may also perform selected logical operations on the serialized graphics data stream to implement such display effects as blinking, reverse video, and bright characters.

Coupled to and receiving the serialized graphics data stream from the serializer 40 is the first converter 42. The primary function of converter 42 is to convert the serialized graphics data stream into a first set of video signals. These video signals preferably include an analog portion and a digital portion. The analog portion is used to drive the CRT display, while the digital portion is passed on to other components in the controller 16 for further processing.

Figure 3A:
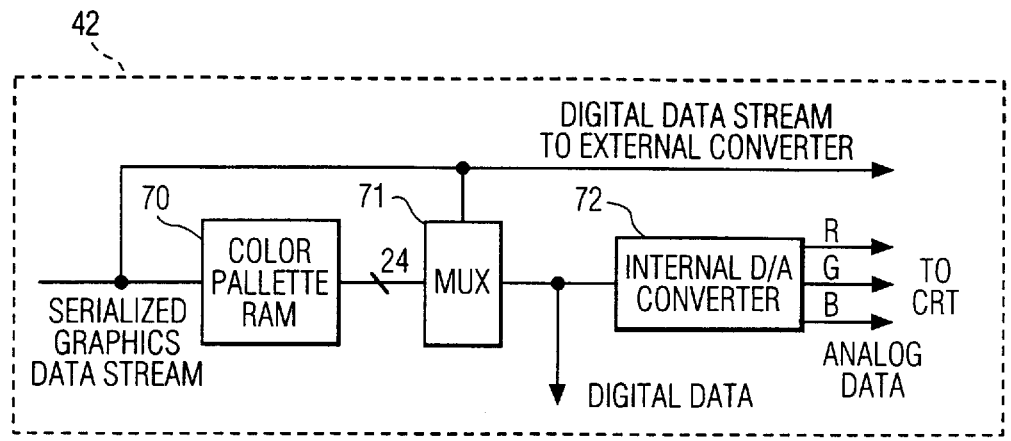
FIGS. 3a–3c show three possible embodiments of the first converter 42 of FIG. 2.

The first converter 42 may take on one of several different forms, depending on the needs of the system and the type of CRT display that is being driven. FIG. 3a shows a first preferred embodiment of the first converter 42, wherein the converter 42 comprises a color palette RAM or Look-Up Table 70 and a digital-to-analog (D/A) converter 72, the combination known as a LUT-DAC. In such an implementation, the color palette Look-Up Table 70 preferably contains a plurality of entries, with each entry storing a set of color information which is composed of a larger number of bits than the serialized graphics data stream, allowing thereby a finer granularity of color selection. The serialized graphics data stream is applied as an index to the Look-Up Table 70 which outputs the color information contained in the entry corresponding to the applied index. The color information from the Look-Up Table 70 is then applied to the D/A converter 72 where it is converted into a set of analog signals which may be used to drive the CRT display. In the implementation shown in FIG. 3a, the display being driven is a computer monitor, and the digital portion of the video signals is the output data (i.e. the color information) from the color palette Look-Up Table 70. In an alternative mode of operation, the LUT may be bypassed and information applied directly to the DAC.

Figure 3B:
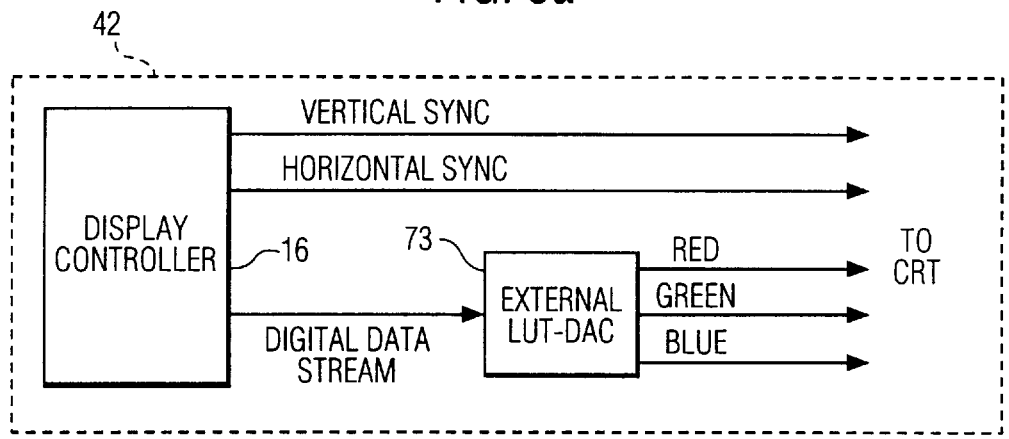

FIG. 3b shows an alternative embodiment where the serialized color information may be applied to a LUT-DAC 73 located external to the display controller 16 in order to provide for a range of color information beyond that possible with the internal LUT-DAC 72. In this arrangement, the external LUT-DAC 73 has a Look Up Table containing a larger number of entries than is possible or practical with a LUT internal to a display controller device.

Figure 3C:
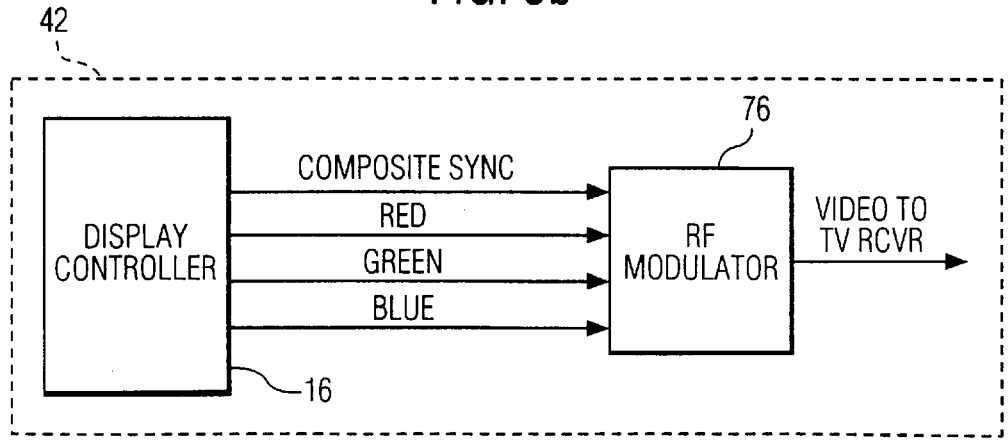

FIG. 3c shows yet another embodiment of the first converter, suitable for driving a standard TV monitor. In this arrangement, the color information, accompanied by a composite sync signal merging both horizontal and vertical syncs, is applied to a modulator 76 which generates an RF signal compatible with TV monitors.

Referring again to FIG. 2, in order to properly drive a CRT type of display, control signals are needed in addition to the analog video signals from the first converter. Signals such as the horizontal sync (HSYNC) and vertical sync (VSYNC) signals are needed to properly control the displaying of the analog video signals. The CRT controller 58 is the component responsible for generating the control signals, and controlling the overall operation of the display. Preferably, CRT controller 58 comprises a set of registers which control a timing chain. This timing chain synchronously drives the conversion of graphics data accessed from the display memory 36 into video signals usable by the display, and also generates the HSYNC and VSYNC signals needed by the display for proper operation.

The components involved in driving the CRT type of display have been described. The components involved in driving the LCD will now be described. These components include the second converter 44, the write buffer 46, the frame buffer 48, the read buffer 50, the frame buffer control 52, the dithering engine 54, and the flat panel controller 56.

As shown in FIGS. 3a–3c, the digital portion of the first set of video signals is either the serialized graphics data stream itself, or a modified form of the serialized graphics data stream (modified by the Look-Up Table 70). The graphics data stream is typically structured such that it is designed to be displayed by the CRT type of display. To convert this data stream into a second set of video signals which can be used to drive an LCD, it may be necessary to first convert the data stream into a form appropriate for the second display. Such is the primary function of the second converter 44. Preferably, the second converter 44 performs at least two functions. First, converter 44 processes the digital portion of the first set of video signals in accordance with a selected weighting function to derive a set of weighted data. The preferred weighting function is to separate the digital video signal into Red, Green, and Blue (R,G, and B) components and to multiply each component by a weighting factor using digital multiplication techniques well known in the art as follows: [0.30R+0.59G+0.11B]. Other weighting functions or no weighting at all may be used depending on the characteristics of the second display. Second, converter 44 performs a mapping function on the weighted data to translate the weighted data into a second stream of graphics data. In the preferred embodiment, the mapping function consists of a small Look-Up Table which can be programmed experimentally to provide fine tuning of the conversion to suit a particular type of LCD or other display. Overall, the second converter 44 places the graphics data into a form that can be used to derive the video signals for driving the LCD. In some applications, it may not be necessary to do this translation; hence, converter 44 is optional.

The second converter 44 is responsible for deriving the second stream of graphics data. The write buffer 46, frame buffer 48, read buffer 50, and frame buffer controller 52 are responsible for generating the second stream of graphics data to prepare it for conversion into video signals for driving the LCD. In performing this function, the write buffer 46 (which preferably is a FIFO buffer) has an input coupled to the second converter 44 for receiving and storing the second stream of graphics data, and an output coupled to the frame buffer 48 for sending the second stream of graphics data on to the frame buffer. An interesting point to note with regard to write buffer 46 is that, as shown in FIG. 2, it receives data from the second converter 44 at a rate determined by the clock rate of the video clock signal, but outputs data at a rate determined by the clock rate of the memory clock. This is an important feature of the present invention because it provides for a transition in clock rate. As will be explained later, it is this clock rate transition which allows the two displays to be refreshed at two independent and optimal refresh rates.

The frame buffer 48 receives the second stream of graphics data outputted from the write buffer 46. The primary function of frame buffer 48 is to store the graphics data which is to be displayed on the LCD. Frame buffer 48 is analogous to the display memory 36 in that the display memory 36 stores the graphics data to be displayed on the CRT while the frame buffer 48 stores the graphics data to be displayed on the LCD. In FIG. 2, display memory 36 and frame buffer 48 are shown as two separate memories. It should be noted that, if so desired, display memory 36 and frame buffer 48 may be implemented using a single memory, with the display memory 36 and the frame buffer 48 being separate partitions or portions of the memory.

The read buffer 50, coupled to the frame buffer 48, is used to read the graphics data out of the frame buffer 48, and to pass the data on to the dithering engine 54 where the data is dithered to provide an expansion of color information suitable for driving the LCD. Read buffer 50, like the write buffer 46, is preferably a FIFO. Unlike the write buffer 46, however, data is preferably transferred into and out of the read buffer 50 at the same clock rate.

The overall operation of the buffers 46, 48, and 50 is controlled by the frame buffer controller 52. Controller 52 controls the data exchange among the buffers 46, 48, 50 and the timing of these exchanges. In the preferred embodiment, controller 52 takes the form of a state machine. The operation of frame buffer controller 52 will become more clear when the operation of the overall display controller 16 is described in a later section.

The conversion of the second stream of graphics data into color information which can be used to drive the LCD is performed by the dithering engine 54. The dithering engine 54 receives the graphics data from the read buffer 50. The process of dithering is known in the art to allow a display which has a limited number of displayable colors to emulate a display capable of a larger number of colors through a variety of techniques. The techniques for dithering color information include sub-sampling the color information over a number of frames, pulse width modulation, and averaging color over a group of pixels. The dithered signals are thereafter passed on to the flat panel controller 56, which formats the dithered signals into a sequence of signals suitable for the particular LCD in use. Each LCD may have unique interface requirements which determine how the dithered RGB data is packed and transferred.

Several points should be noted with regard to the dithering engine 54. First, the placement of the dithering engine 54 relative to the other components is important. In prior art controllers where the frame buffer stored dithered data for half the LCD panel, the dithering pattern was different for the two halves of the screen, thus creating an inferior display. Also in prior art controllers, the dithering engine was placed in such a location that the data transfer rate into the dithering engine was dictated by the clock used to derive the video signals for driving the CRT. This meant that the video signals coming out of the dithering engine had a data rate which was tied to the CRT data rate. This in turn meant that the LCD would be driven by video signals having a data rate optimized for the CRT but not for the LCD. This caused the display quality of prior art LCD displays to suffer. By contrast, in the present invention, the dithering engine 54 is placed in a location where the dithering of the color data is synchronous and coherent with the frame rate of the LCD and the data rate is in no way tied to the CRT data rate. The data rate change is implemented by the write buffer 46. By the time the dithering engine receives the second stream of graphics data, the data rate is already optimized for the LCD. As a result, the video signals coming out of the dithering engine will have a clock rate optimized for the LCD. This significantly improves the display quality of the LCD.

As a second point, it should be noted that the dithering engine 54 may be operated, if so desired, in response to a third clock having a third clock rate independent of the clock rates of the video and memory clock signals. This may be desirable to further optimize the refresh rate of the LCD.

As a final component, display controller 16 preferably further comprises a power controller 60 coupled to the display memory 36. The function of controller 60 is to turn off selected components when these components are not needed. To elaborate, there may be occasions where: (1) only the LCD is being driven; and (2) the host computer 12 is not updating the graphics data sent to the display controller 16 (such as when the user has not initiated activity requiring update of the display). On such occasions, it is not necessary to derive video signals for the CRT, or to update the frame buffer 48. To conserve power, controller 60 preferably halts operation of selected components during such occasions. More specifically, controller 60 operates by determining whether updates are being sent to the display memory 36, and whether a CRT display is coupled to the display controller 16. If neither condition is met (i.e. no updates and no CRT display), then controller 60 preferably disables the video clock signal. This causes components 38, 40, 42, 44, and 46 to halt operation, thereby saving power. Since the memory clock is still active, components 48, 50, 52 54, and 56 will still operate; hence, the LCD will function as normal. Upon detection of updates to the display memory, power controller 60 will re-enable the video clock signal to allow all of the components to operate as usual.

Figure 4:
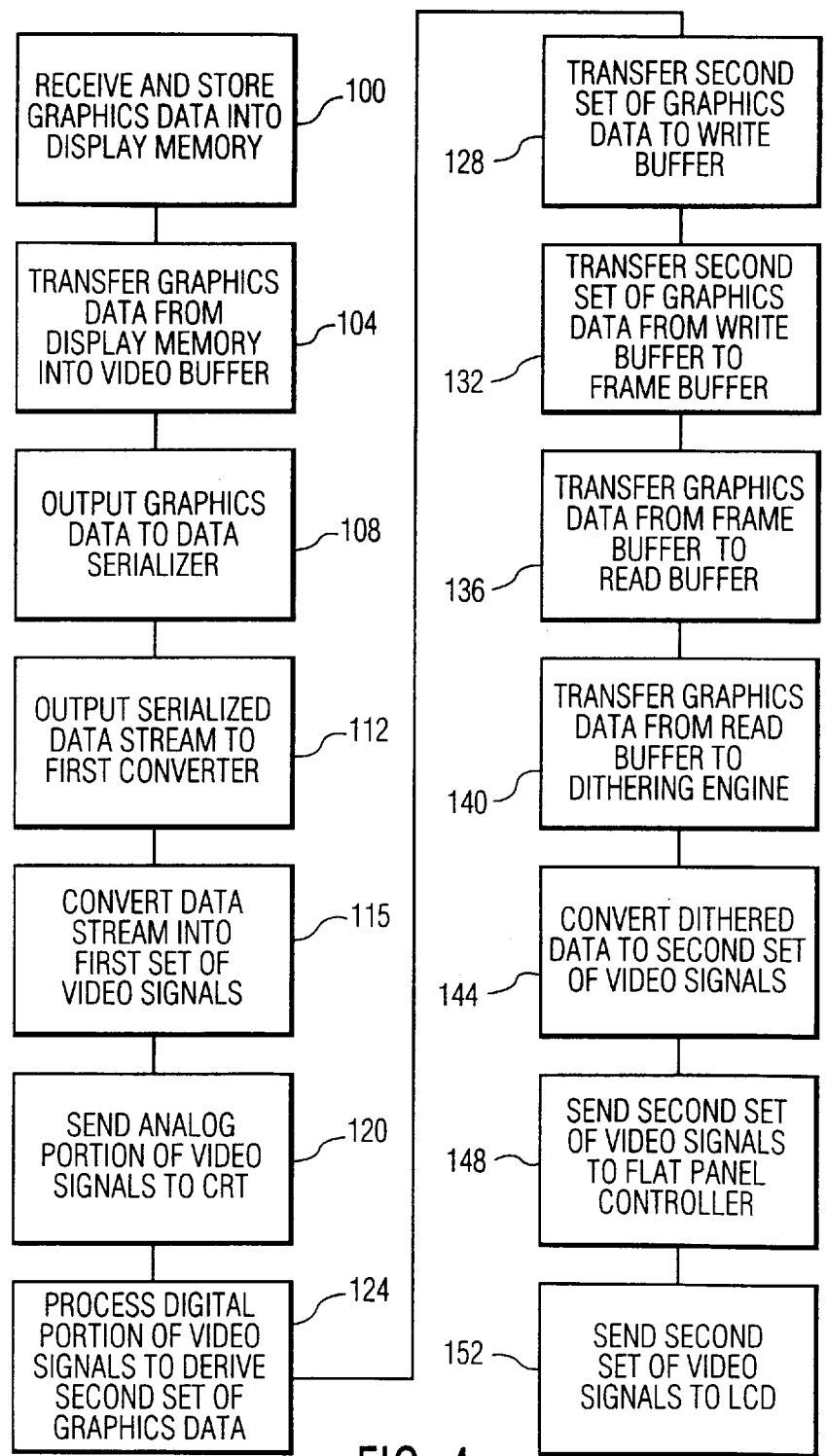
FIG. 4 is a flow diagram of the method for driving a plurality of displays using the present invention.

All of the components of the display controller 16 of the present invention have been described. With reference to the operational flow diagram shown in FIG. 4, the overall operation of display controller 16 will now be described. Controller 16 begins operation by receiving 100 graphics data from the host computer 12 and storing the graphics data into the display memory 36. As mentioned previously, the storing of graphics data is controlled by the video controller 32. Depending upon the particular application, the data may be processed and manipulated before and/or after it is stored within the display memory 36. Once the graphics data is received and stored, it is ready to be converted into video signals for driving the displays.

The conversion process begins with transferring 104 the graphics data from the display memory 36 to the video buffer 38. Preferably, this data transfer is done at a rate determined by the clock rate of the memory clock signal. Thereafter, the graphics data is outputted 108 from the video buffer 38 to the data serializer 40 at a rate determined by the video clock signal. Note that different clock signals are used for transferring data into and out of the video buffer 38. The memory clock signal is used for transferring data into the buffer 38 to accommodate the display memory 36. The video clock signal is used for transferring data out of the buffer 38 to optimize the refresh rate for the CRT.

Upon receiving the graphics data from the video buffer, the data serializer 40 transforms the data into a serialized graphics data stream. This step prepares the data for conversion into video signals. Once derived, the serialized data stream is outputted 112 to the first converter 42, preferably at a rate determined by the video clock signal. In response, the first converter 42 converts 116 the serial data stream into a first set of video signals having both an analog portion and a digital portion. The analog portion is sent 120 on to the CRT display to drive the display, while the digital portion is processed further. As shown in FIG. 2, the analog portion of the video signals are sent to the display at a rate determined by the rate of the video clock signal. Preferably, the rate of the video clock signal is selected such that it causes the refresh rate of the CRT display to be optimized. This ensures that the CRT display will operate at its optimal level. The first display is thus driven.

To drive the second display, the digital portion of the first set of video signals needs to be converted into a second set of video signals which can be used to drive the second display. This conversion process preferably begins with processing 124 the digital portion of the first set of video signals through the second converter 44 to derive a second stream of graphics data. As mentioned previously, the second converter 44 generates a set of graphics data which is appropriate for display by the second display (the LCD). Once derived, the second stream of graphics data is transferred 128 to the write buffer at a rate determined by the rate of the video clock signal. At this point, the rate of data transfer is still dictated by the clock signal used to optimize the refresh rate of the CRT display. This clock rate may not be (and most likely is not) the clock rate which optimizes the refresh rate for the LCD since the LCD is a totally different type of display device. Thus, in order to optimize the refresh rate for the LCD, it is necessary to change clock rates. The write buffer 46 provides a mechanism for achieving this.

To implement a clock rate change, the second stream of graphics data is first transferred from the second converter 44 to the write buffer 46 at a rate determined by the clock rate of the video clock signal. Then, the same data is transferred 132 out of the write buffer 46 into the frame buffer 48 at a rate determined by the clock rate of the memory clock signal. By so doing, the data transfer rate is altered. Preferably, the clock rates of the video clock signal and the memory clock signal are independent of one another. Also, the clock rate of the memory clock signal is preferably selected such that it causes the refresh rate of the LCD to be optimized. This helps to ensure that the LCD will perform at an optimal level.

Once the second stream of graphics data is stored into the frame buffer 48, it is transferred 136 out of the frame buffer 48 into the read buffer 50 at a rate determined by the rate of the memory clock signal. In turn, the read buffer 50 outputs 140 the (third) stream of graphics data to the dithering engine 54, preferably at a rate determined by the rate of the memory clock signal, for processing. The dithering engine 54 thereafter converts 144 the third stream of graphics data from the read buffer 50 into a second set of video signals, and sends 148 the video signals to the flat panel controller 56 at a rate determined by the rate of the memory clock signal. Finally, the controller 56 sends 152 the video signals to the LCD at a rate determined by the rate of the memory clock signal. The second display is thus driven. Since the rate of the memory clock signal was selected to optimize the refresh rate of the LCD, optimal performance by the LCD is ensured.

As described above, both of the displays are driven at optimal refresh rates. Hence, both displays, driven simultaneously, will perform at optimal levels. This represents a significant improvement over the prior art.

The display controller 16 of FIG. 2 may take one of many forms. It may be implemented in the form of a single integrated circuit device, or it may be implemented with several discrete components on a printed circuit board. In the preferred embodiment, all of the components shown in FIG. 2 are incorporated into a single integrated circuit with the exception of the display memory 36 and the frame buffer 48, which are implemented on a separate device. Other implementations are possible such as the further integration of display memory, the frame buffer or both into a single integrated circuit. As noted previously, the frame buffer may be a separate device or may be contained within the display memory device.

I claim:

1. A method for driving a plurality of displays simultaneously, comprising the steps of:
   (a) producing a first graphics data stream from a display memory at a rate determined by a first clock signal having a first clock rate;
   (b) converting the first graphics data stream into a first video data stream at a rate determined by the first clock signal, the first video data stream having an analog portion and a digital portion;
   (c) sending the analog portion of the first video data stream to a first video receiver for display;
   (d) converting the digital portion of the first video data stream into a second video data stream for display by a second video receiver wherein the step (d) comprises the steps of:
   i. converting the digital portion of the first video data stream into a second stream of graphics data at a rate determined by the first clock signal;
   ii. storing the second stream of graphics data into a write buffer at a rate determined by the first clock signal;
   iii. storing the second stream of graphics data from the write buffer into a frame buffer at a rate determined by a second clock signal having a second clock rate, the second clock rate being independent of the first clock rate;
   iv. transferring graphics data from the frame buffer into a read buffer at a rate determined by the second clock signal;
   v. producing a third stream of graphics data from the read buffer at a rate determined by the second clock signal;
   vi. dithering the third stream of graphics data from the read buffer at a rate determined by the second clock signal to derive a set of dithered data;
   vii. converting the dithered data to a second stream of video data at a rate determined by a second clock signal and;
   viii. sending the second stream of video data to a second video receiver for display.

2. The method of claim 1, wherein the step of converting the first graphics data stream into a first video data stream comprises the steps of:
   (a) applying the first graphics data stream as an index to a look-up table; and
   (b) outputting data from the look-up table to a digital-to-analog converter.

3. The method of claim 1, wherein the step of converting the first graphics data stream into a first stream of video data comprises the step of:
   (a) applying the first graphics data stream to a digital-to-analog converter.

4. The method of claim 1, wherein the step of converting the first graphics data stream into a first stream of video data comprises the steps of:
   (a) applying the first graphics data stream as an index to a look-up table; and
   (b) outputting data from the look-up table to an R-F modulator.

5. The method of claim 1, wherein the step of converting the digital portion of the first video data stream into a second stream of graphics data comprises the step of:
   (a) processing the digital portion of the first video data stream in accordance with a selected weighting function to derive a set of weighted data.

6. The method of claim 1, wherein the step of converting the digital portion of the first video data stream into a second stream of graphics data further comprises the step of:
   (a) processing the weighted data through a programmable mapping function to translate the weighted data into the second stream of graphics data.

7. The method of claim 1, further comprising the steps of:
   (a) determining whether the display memory has been updated for a predetermined period of time; and
   (b) suspending transference of data into the frame buffer if the display memory has not been updated for a predetermined period of time.

8. An apparatus for driving a plurality of displays simultaneously, comprising:
   (a) a display memory for storing a first set of graphics data;

(b) a graphics buffer coupled to the display memory for receiving and storing a first stream of graphics data from the display memory, the graphics buffer outputting the first stream of graphics data stored therein at a rate determined by a first clock signal having a first clock rate;

(c) a data serializer coupled to the graphics buffer for receiving and processing the first graphics data stream to derive a stream of serialized graphics data at a rate determined by the first clock signal;

(d) a first converter coupled to the data serializer for receiving and converting the serialized graphics data stream into a first video data stream at a rate determined by the first clock signal, the first video data stream having an analog portion and a digital portion;

(e) a second converter coupled to the first converter for receiving and converting the digital portion of the first video data stream into a second serialized stream of graphics data at a rate determined by the first clock signal;

(f) a write buffer coupled to the second converter for receiving and storing the second stream of graphics data from the second converter at a rate determined by the first clock signal, the write buffer outputting the second stream of graphics data stored therein at a rate determined by a second clock signal, the second clock rate being independent from the first clock rate;

(g) a frame buffer coupled to the write buffer for receiving and storing the second stream of graphics data from the write buffer, the frame buffer outputting the graphics data stored therein as a third stream of graphics data at a rate determined by the second clock signal;

(h) a read buffer coupled to the frame buffer for receiving and storing the third stream of graphics data from the frame buffer, the read buffer outputting the third stream of graphics data at a rate determined by the second clock signal;

(i) a first controller coupled to the write buffer, the frame buffer and the read buffer for initiating the transfer of data between the buffers at a rate determined by the second clock signal;

(j) a dithering engine coupled to the read buffer for receiving and processing the third stream of graphics data from the read buffer to derive a second video data stream at a rate determined by the second clock signal; and (k) a second controller coupled to the dithering engine and the read buffer for initiating and controlling the conversion of the third stream of graphics data into the second video data stream.

9. The apparatus of claim 8, wherein the analog portion of the first video data stream is coupled to a first display and the second video data stream is coupled to a second display.

10. The apparatus of claim 8, wherein the display memory and the frame buffer are two separate memories.

11. The apparatus of claim 8, wherein the display memory and the frame buffer are separate portions of a single memory.

12. The apparatus of claim 8, wherein the first converter comprises:

a look-up table memory having a data output; and a digital-to-analog converter coupled to the data output of the look-up table memory.

13. The apparatus of claim 8, wherein the first converter comprises an RF modulator.

14. The apparatus of claim 8, wherein the second converter comprises:

(a) means for processing the digital portion of the first video data stream in accordance with a selected weighting function to derive a set of weighted data; and (b) means for translating the weighted data into the second serialized stream of graphics data which is customized for a second video display.

15. The apparatus of claim 8, further comprising:

(a) a controller coupled to the display memory for determining whether the display memory has been updated with new graphics data within a predetermined period of time, the controller suspending transference of data into the frame buffer, thereby reducing power consumption, in response to a determination that the display memory has not been updated with new graphics data within a predetermined period of time.

16. An apparatus for driving a plurality of displays simultaneously, comprising:

(a) a display memory for storing a first set of graphics data;

(b) a graphics buffer coupled to the display memory for receiving and storing a first stream of graphics data from the display memory, the graphics buffer outputting the first stream of graphics data stored therein at a rate determined by a first clock signal having a first clock rate;

(c) a data serializer coupled to the graphics buffer for receiving and processing the first graphics data stream to derive a stream of serialized graphics data at a rate determined by the first clock signal;

(d) a first converter coupled to the data serializer for receiving and converting the serialized graphics data stream into a first video data stream at a rate determined by the first clock signal, the first video data stream having an analog portion and a digital portion;

(e) a second converter coupled to the first converter for receiving and converting the digital portion of the first video data stream into a second serialized stream of graphics data at a rate determined by the first clock signal;

(f) a write buffer coupled to the second converter for receiving and storing the second stream of graphics data from the second converter at a rate determined by the first clock signal, the write buffer outputting the second stream of graphics data stored therein at a rate determined by a second clock signal, the second clock rate being independent from the first clock rate;

(g) a frame buffer coupled to the write buffer for receiving and storing the second stream of graphics data from the write buffer, the frame buffer outputting the graphics data stored therein as a third stream of graphics data at a rate determined by the second clock signal;

(h) a read buffer coupled to the frame buffer for receiving and storing the third stream of graphics data from the frame buffer, the read buffer outputting the third stream of graphics data at a rate determined by the second clock signal;

(i) a first controller coupled to the write buffer, the frame buffer and the read buffer for initiating the transfer of data between the buffers at a rate determined by the second clock signal;

(j) a dithering engine coupled to the read buffer for receiving and processing the third stream of graphics data from the read buffer to derive a second video data stream at a rate determined by a third clock signal, the third clock signal being independent of the first clock signal and the second clock signal; and (k) a second controller coupled to the dithering engine and the read buffer for initiating and controlling the conversion of the third stream of graphics data into the second video data stream at a rate determined by the third clock signal.

17. The apparatus of claim 16, wherein the analog portion of the first video data stream is coupled to a first display and the second video data stream is coupled to a second display.

18. The apparatus of claim 16, wherein the display memory and the frame buffer are two separate memories.

19. The apparatus of claim 16, wherein the display memory and the frame buffer are separate portions of a single memory.

20. The apparatus of claim 16, wherein the first converter comprises:

a look-up table memory having a data output; and a digital-to-analog converter coupled to the data output of the look-up table memory.

21. The apparatus of claim 16, wherein the first converter comprises an RF modulator.

22. The apparatus of claim 16, wherein the second converter comprises:

i. means for processing the digital portion of the first video data stream in accordance with a selected weighting function to derive a set of weighted data; and ii. means for translating the weighted data into the second serialized stream of graphics data which is customized for a second video display.

23. The apparatus of claim 16, further comprising:

i. a controller coupled to the display memory for determining whether the display memory has been updated with new graphics data within a predetermined period of time, the controller suspending transference of data into the frame buffer, thereby reducing power consumption, in response to a determination that the display memory has not been updated with new graphics data within a predetermined period of time.

24. An integrated circuit for driving a plurality of displays, the integrated circuit coupled to a display memory and a frame buffer, and comprising:

(a) a graphics buffer coupled to the display memory for receiving and storing a first stream of graphics data from the display memory, the graphics buffer outputting the first stream of graphics data stored therein at a rate determined by a first clock signal having a first clock rate;

(b) a data serializer coupled to the graphics buffer for receiving and processing the graphics data stream to derive a stream of serialized graphics data at a rate determined by the first clock signal;

(c) a first converter coupled to the data serializer for receiving and converting the serialized graphics data stream into a first video data stream at a rate determined by the first clock signal;

(d) a second converter coupled to the first converter for receiving and converting the video data stream into a second serialized stream of graphics data at a rate determined by the first clock signal;

(e) a write buffer coupled to the second converter for receiving and storing the second stream of graphics data from the second converter at a rate determined by the first clock signal, the write buffer outputting the second stream of graphics data stored therein at a rate determined by a second clock signal, the second clock rate being independent from the first clock rate;

(f) a frame buffer coupled to the write buffer for receiving and storing the second stream of graphics data from the write buffer, the frame buffer outputting the graphics data stored therein as a third stream of graphics data at a rate determined by the second clock signal;

(g) a read buffer coupled to the frame buffer for receiving and storing the third stream of graphics data from the frame buffer, the read buffer outputting the third stream of graphics data at a rate determined by the second clock signal (h) a first controller coupled to the write buffer, the frame buffer and the read buffer for initiating the transfer of data between the buffers at a rate determined by the second clock signal;

(i) a dithering engine coupled to the read buffer for receiving and processing the third stream of graphics data from the read buffer to derive a second video data stream at a rate determined by the second clock signal;

(j) a second controller coupled to the dithering engine and the read buffer to initiate the transfer and conversion of the third stream of graphics data to a second video data stream.

25. An integrated circuit for driving a plurality of displays, the integrated circuit coupled to a display memory and a frame buffer, and comprising:

(a) a graphics buffer coupled to the display memory for receiving and storing a first stream of graphics data from the display memory, the graphics buffer outputting the first stream of graphics data stored therein at a rate determined by a first clock signal having a first clock rate;

(b) a data serializer coupled to the graphics buffer for receiving and processing the graphics data stream to derive a stream of serialized graphics data at a rate determined by the first clock signal;

(c) a first converter coupled to the data serializer for receiving and converting the serialized graphics data stream into a first video data stream at a rate determined by the first clock signal;

(d) a second converter coupled to the first converter for receiving and converting the video data stream into a second serialized stream of graphics data at a rate determined by the first clock signal;

(e) a write buffer coupled to the second converter for receiving and storing the second stream of graphics data from the second converter at a rate determined by the first clock signal, the write buffer outputting the second stream of graphics data stored therein at a rate determined by a second clock signal, the second clock rate being independent from the first clock rate;

(f) a frame buffer coupled to the write buffer for receiving and storing the second stream of graphics data from the write buffer, the frame buffer outputting the graphics data stored therein as a third stream of graphics data at a rate determined by the second clock signal;

(g) a read buffer coupled to the frame buffer for receiving and storing the third stream of graphics data from the frame buffer, the read buffer outputting the third stream of graphics data at a rate determined by the second clock signal (h) a first controller coupled to the write buffer, the frame buffer and the read buffer for initiating the transfer of data between the buffers at a rate determined by the second clock signal;

(i) a dithering engine coupled to the read buffer for receiving and processing the third stream of graphics data from the read buffer to derive a second video data stream at a rate determined by a third clock signal, the third clock signal being independent of the first clock signal and the second clock signal; and (j) a second controller coupled to the dithering engine and the read buffer to initiate the transfer and conversion of the third stream of graphics data to a second video data stream at a rate determined by a third clock signal.

* * * * *